US009229187B2

(12) United States Patent
Cooke et al.

(10) Patent No.: US 9,229,187 B2
(45) Date of Patent: Jan. 5, 2016

(54) FAN-OUT ASSEMBLIES AND FIBER OPTIC ASSEMBLIES INCLUDING FIBER MANAGEMENT STRUCTURE FOR FURCATIONS

(71) Applicant: Corning Cable Systems LLC, Hickory, NC (US)

(72) Inventors: Terry Lee Cooke, Hickory, NC (US); Paula De la Rosa Moyeda, Reynosa (MX); Christopher Shawn Houser, Newton, NC (US); Norberto Marquez Cayetano, Reynosa (MX); Francisco Luna Pina, Hickory, NC (US); Roberto Valderrabano Berrones, Reynosa (MX)

(73) Assignee: Corning Cable Systems LLC, Hickory, NC (US)

( * ) Notice: Subject to any disclaimer, the term of this patent is extended or adjusted under 35 U.S.C. 154(b) by 196 days.

(21) Appl. No.: 14/158,174

(22) Filed: Jan. 17, 2014

(65) Prior Publication Data

US 2015/0093084 A1    Apr. 2, 2015

Related U.S. Application Data

(60) Provisional application No. 61/884,459, filed on Sep. 30, 2013.

(51) Int. Cl.
*G02B 6/00* (2006.01)
*G02B 6/44* (2006.01)

(52) U.S. Cl.
CPC ............ *G02B 6/4471* (2013.01); *G02B 6/4472* (2013.01); *G02B 6/4477* (2013.01); *G02B 6/443* (2013.01); *G02B 6/4403* (2013.01); *G02B 6/4483* (2013.01)

(58) Field of Classification Search
CPC .......................... G02B 6/4471; G02B 6/4477
See application file for complete search history.

(56) References Cited

U.S. PATENT DOCUMENTS

| 2013/0094814 A1* | 4/2013 | Ishida | G02B 6/3887 385/77 |
| 2014/0037255 A1* | 2/2014 | Mullaney | G02B 6/4471 385/100 |

* cited by examiner

*Primary Examiner* — Michelle R Connelly
*Assistant Examiner* — Hoang Tran

(57) ABSTRACT

Fiber management structures for fan-out assemblies that are used to furcate a fiber optic cable are disclosed, as are fiber optic assemblies with fiber management structures and related methods. The fiber management structures each include channels extending between opposed first and second ends. A plurality of fan-out tubes are received in the plurality of channels such that the fiber management structure organizes the fan-out tubes, thereby allowing a compact furcation body to be formed even when furcating high fiber count cables.

16 Claims, 11 Drawing Sheets

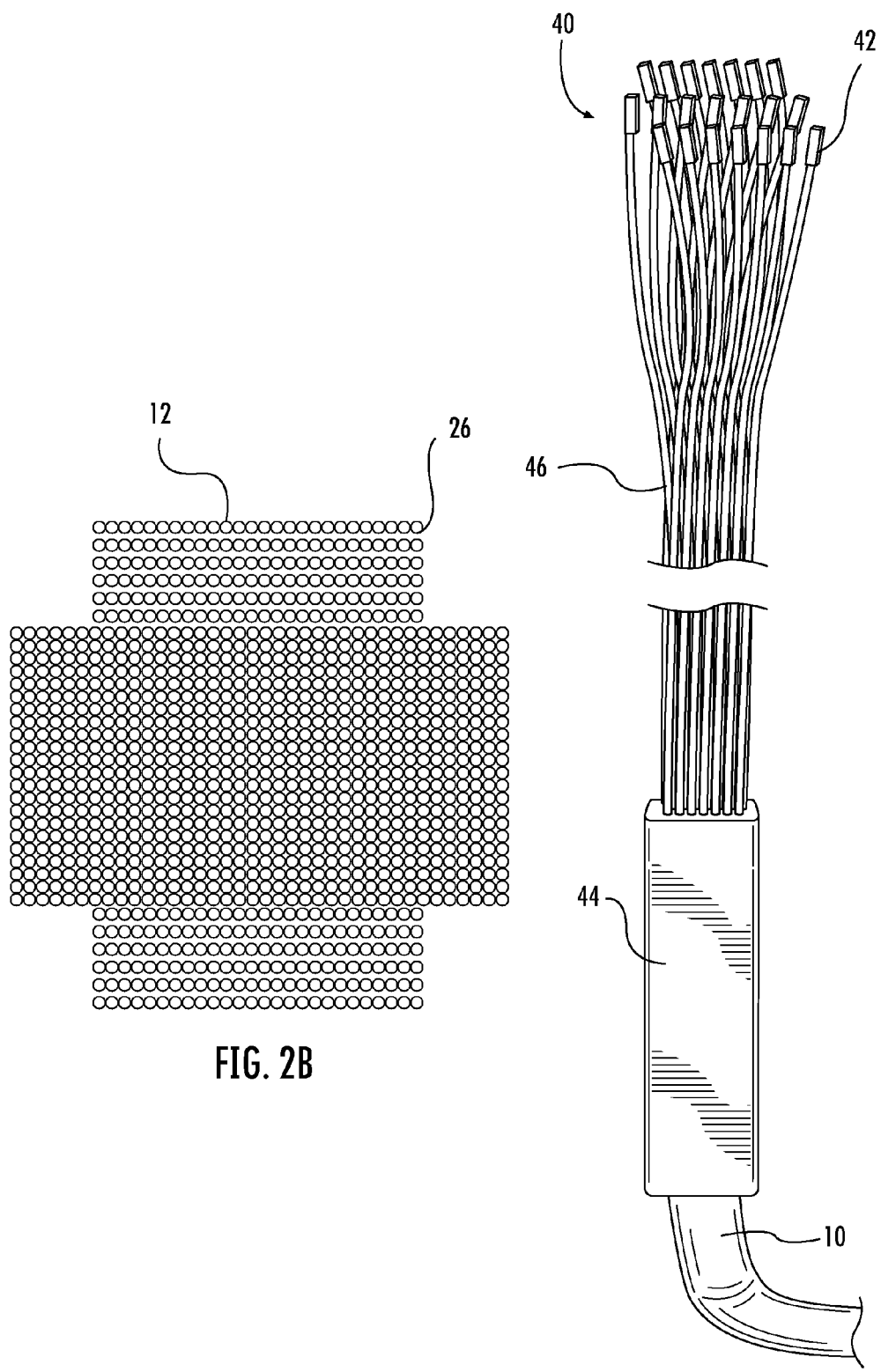

FAN-OUT ASSEMBLIES AND FIBER OPTIC ASSEMBLIES INCLUDING FIBER MANAGEMENT STRUCTURE FOR FURCATIONS

CROSS-REFERENCE TO RELATED APPLICATIONS

This application claims the benefit of priority under 35 U.S.C. §119 of U.S. Provisional Application Ser. No. 61/884,459, filed on Sep. 30, 2013, the content of which is relied upon and incorporated herein by reference in its entirety.

BACKGROUND

The disclosure relates generally to fiber optic cables, and more particularly to fiber optic assemblies including a furcation body, fan-out assemblies used in such fiber optic assemblies, and methods of furcating fiber optic cables to form such fiber optic assemblies.

Fiber optic cables are widely used in the telecommunications industry to transmit voice, video, and data signals. The cables include one or more optical fibers surrounded by one or more layers of material designed to protect the optical fibers from the environment in which the cables are used. To meet ever-increasing bandwidth demands, fiber optic cables are being developed with relatively large numbers of optical fibers. These high fiber count cables are often the trunk cables that form the backbone of transmissions in local area networks (LANs) and data centers.

In many instances, the optical fibers in a high fiber count cable are arranged ribbons each containing multiple rows optical fibers (e.g., 12 optical fibers per ribbon). The ribbons are stacked on top of each other and may be arranged in arrays with more than one row of stacked ribbons. Ribbon cables provide the highest fiber density relative to cable diameter, allowing the most efficient use of pathways and spaces where the cables must be routed. For these and other reasons, ribbon cables are the primary choice of cable type for applications where fiber counts of 24 or more are required.

One of the challenges associated with using high fiber count cables is that ultimately the cables must be terminated to allow mating with equipment or other fiber optic cables. Termination typically involves installing fiber optic connectors onto the optical fibers. For example, ribbons may be split into individual optical fibers to allow simplex connectors (e.g., LC or SC connectors) to be installed on respective optical fibers or duplex connectors to be installed on respective pairs of optical fibers. Alternatively, multi-fiber connectors (e.g., MTP connectors) may be installed onto each ribbon. Harnesses or modules may then be used to breakout the multi-fiber connectors into simplex or duplex connectors.

Termination can be done in the field, but factory-terminated cables are typically desired for high fiber count trunks because such preterminated cable assemblies expedite installations and are generally associated with lower connector insertion losses. One way of providing a preterminated cable assembly involves using a furcation to distribute/separate the optical fibers from a trunk cable. The furcation includes a body or plug formed over a portion of the cable where the protective layers have been removed to expose the optical fibers. The body or plug is also formed over a portion of furcation tubes/legs that are placed over the exposed optical fibers. The furcation legs provide protection between the furcation body or plug and the connectors. With such an arrangement, the furcation body terminates the strength members and helps isolate fiber strain in the cable from the connectors. The furcation is also able to serve as a load distribution point for pulling grips and as an attachment point to attach the cable assembly to racks, cabinets, or other hardware.

As fiber counts increase, furcating trunk cables becomes more difficult. Guiding the optical fibers into furcation legs can be difficult to manage, especially when attempting to minimize the size of the furcation. Size is an important consideration because if the furcation is too large, the cable assembly may be too big to be pulled through existing ducts and other pathways and/or may limit bend radius to unacceptable values. Space constraints, budgets, installation times, and other practical considerations may not allow for providing larger ducts/pathways.

SUMMARY

One embodiment of the disclosure relates to a fan-out assembly including a plurality of fan-out tubes that each have an inner tube, a layer of strength members surrounding the inner tube, and an outer protective tube. The fan-out assembly also includes a fiber management structure having opposed first and second ends, a base wall and plurality of channels extending between the first and second ends, and a plurality of holes extending through the base wall. The plurality of holes communicate with the plurality of channels. The plurality of fan-out tubes are secured in and extend from the plurality of channels, with the strength members of the plurality of fan-out tubes extending through the plurality of holes.

An additional embodiment of the disclosure relates to a fiber optic assembly including a fiber optic cable, a plurality of fan-out tubes, a fiber management structure, and a furcation body. The fiber optic cable includes a plurality of optical fibers, a buffer tube surrounding the plurality of optical fibers, one or more layers of strength members surrounding the buffer tube, and one or more jackets surrounding the one or more layers of strength members. The buffer tube and the one or more jackets are removed from an end portion of the fiber optic cable to expose the plurality of optical fibers and the strength members. The plurality of fan-out tubes are received over the plurality of optical fibers that are exposed at the end portion of the fiber optic cable. The fiber management structure includes opposed first and second ends and a plurality of channels extending between the first and second ends. The plurality of fan-out tubes are received in and extend from the plurality of channels, and the plurality of optical fibers enter the plurality of fan-out tubes within the plurality of channels. The furcation body is formed over the fiber management structure and a portion of the one or more layers of strength members.

Yet another embodiment of this disclosure relates to a fiber optic assembly including a fiber optic cable, a plurality of fan-out tubes, a fiber management structure, and a furcation body. The fiber optic cable includes a plurality of optical fibers, a buffer tube surrounding the plurality of optical fibers, one or more layers of strength members surrounding the buffer tube, and one or more jackets surrounding the one or more layers of strength members. The buffer tube and the one or more jackets are removed from an end portion of the fiber optic cable to expose the plurality of optical fibers and the strength members. The plurality of fan-out tubes are received over the plurality of optical fibers that are exposed at the end portion of the fiber optic cable. In this embodiment, each fan-out tube comprises an inner tube, a layer of strength members surrounding the inner tube, and an outer protective tube. The fiber management structure includes opposed first and second ends, a base wall and plurality of channels extending between the first and second ends, and a plurality of holes extending through the base wall. The plurality of holes communicate with the plurality of channels. The plurality of fan-out tubes are secured in and extend from the plurality of channels, with the strength members of the plurality of fan-out tubes extending through the plurality of holes. The furcation body is formed over the fiber management structure and a portion of the one or more layers of strength members.

In some embodiments, fiber optic assemblies like those described above further include a plurality of connectors installed on ends of the optical fibers that extend from the fan-out tubes, thereby forming cable assemblies.

Methods of furcating a fiber optic cable are also disclosed. One method involves removing one or more jackets from an end portion of the fiber optic cable to expose a plurality of optical fibers and a layer of strength members that surround the plurality of optical fibers. A fan-out assembly is provided, with fan-out assembly comprising a plurality of fan-out tubes and a fiber management structure that defines a plurality of channels extending between opposed first and second ends of the fiber management structure. The plurality of fan-out tubes are secured in the plurality of channels. The method further involves positioning the plurality of optical fibers into a plurality of fan-out tubes, and thereafter forming a furcation body over the fiber management structure and a portion of the strength members of the fiber optic cable. For example, the furcation body in some embodiments may be formed by positioning a shell over the fiber management structure and the strength members, filling the shell with an adhesive, and allowing the adhesive to cure to form a plug.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of fiber optic cable assemblies will appreciate how features and attributes associated with embodiments shown in one of the drawings may be applied to embodiments shown in others of the drawings.

BRIEF DESCRIPTION OF THE DRAWINGS

FIG. 2B is a cross-sectional perspective view of another example how optical fibers may be arranged in the fiber optic cable of FIG. 1;

FIG. 3 is a perspective view of a portion of a fiber optic cable assembly according to one embodiment;

DETAILED DESCRIPTION

Figure 1:
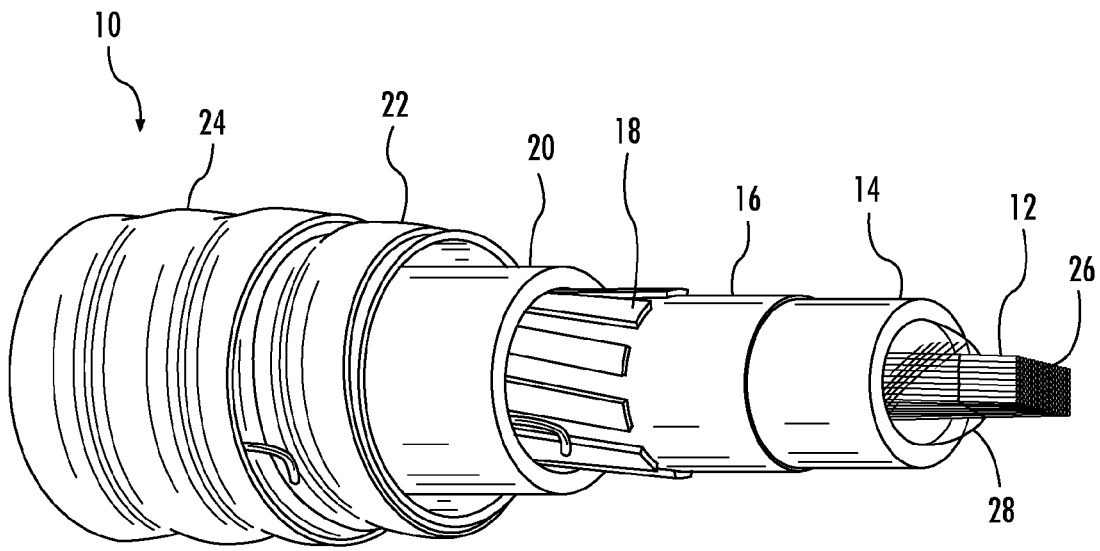
FIG. 1 is a perspective view of one example of a fiber optic cable.

Various embodiments will be further clarified by the following examples. To this end, FIG. 1 illustrates one example of a fiber optic cable 10 having a high fiber count (e.g., 144, 288, 576, or more optical fibers). Although the fiber optic cable is shown in the form of a gel-filled, armored, ribbon cable, the description below may be applicable to other types of fiber optic cables, including gel-free cables, non-armored cables, loose-tube cables, tight-buffered cables, etc., with or without the optical fibers being in ribbons. Indeed, the description below relates primarily to fan-outs and fiber optic assemblies including fan-outs rather than the details of fiber optic cables themselves. Details of the fiber optic cable 10 are provided merely to facilitate discussion of the fan-outs and fiber optic assemblies in the context of a non-limiting embodiment.

Figure 2A:
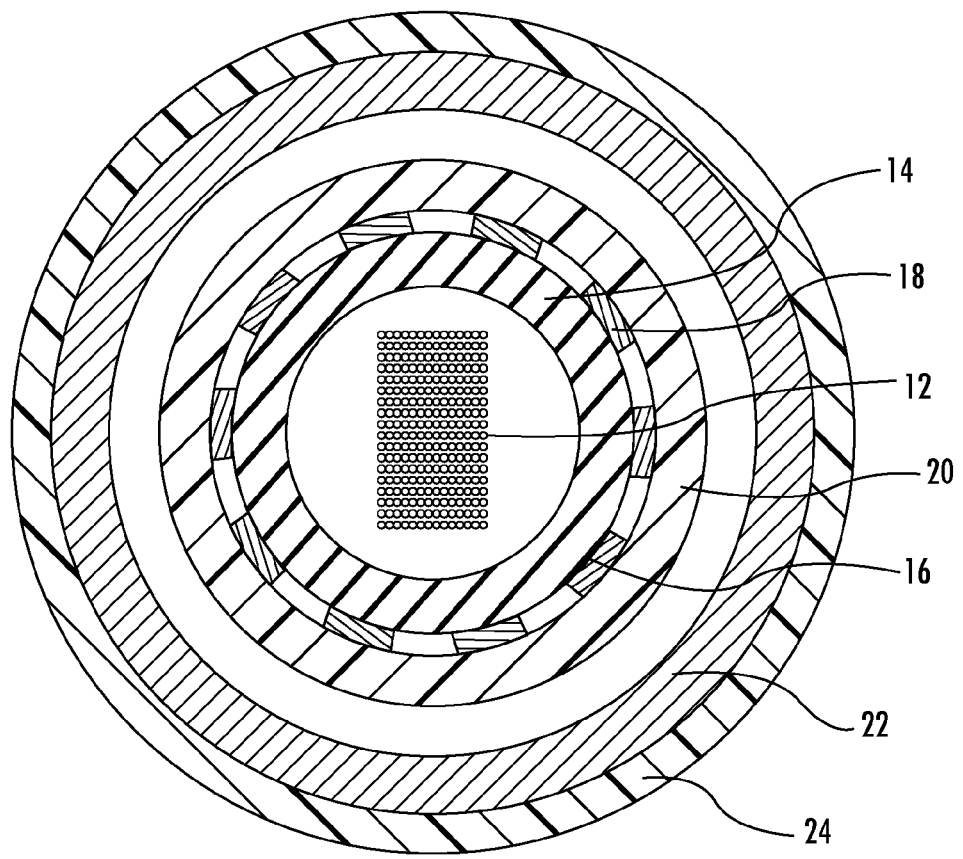
FIG. 2A is a cross-sectional perspective view of an example how optical fibers may be arranged in the fiber optic cable of FIG. 1.

With this in mind, the fiber optic cable 10 includes a plurality of optical fiber ribbons 12 surrounded by a core or buffer tube 14, which in turn is surrounded by a layer of tape 16, a layer of strength members 18, an inner jacket 20, an armor layer 22 of corrugated steel, and an outer jacket 24. The optical fiber ribbons 12 each comprise multiple rows of optical fibers 26 (e.g., 12 rows of optical fibers) that are held together by a thin, flexible supporting medium and color-coded according to industry standards (e.g., TIA/EIA-598-A, "Optical Fiber Cable Color Coding"). Additionally, the optical fiber ribbons 12 are stacked on top of each other to form an array/matrix. The cross-sectional shape of the array depends on the total fiber count of the fiber optic cable 10 and the desired cable diameter. Some fiber optic cables may have linear arrays, as shown in FIG. 2A, while others may have rectangular or more-complex arrays involving adjacent stacks of optical fiber ribbons 12, as shown in FIG. 2B. A water-blocking gel 28 is provided around the array within the core tube 14 in the embodiments shown.

Still referring to FIG. 1, the strength members 18 in the embodiment shown are in the form of aramid yarn. The inner jacket 20 is flame retardant, and the outer jacket 24 is UV-resistant and/or flame retardant. A different number of layers of strength members and/or jackets may be provided in alternative embodiments. Again, the fiber optic cable 10 is merely an example to facilitate discussion.

Now turning to FIG. 3, one embodiment of a fiber optic assembly 40 that includes the fiber optic cable 10 is shown. As can be seen, the fiber optic assembly in this embodiment is a cable assembly because at least one end of the fiber optic cable 10 has been furcated into sub-units of optical fibers that are terminated with connectors 42. The other end of the fiber optic cable assembly 40 may furcated/terminated in a similar manner, or may be terminated by splicing pigtails to the optical fiber ribbons. In the end(s) that are furcated, the furcation occurs within a furcation body 44 formed over an end portion of the fiber optic cable 10 from which the core tube 14, inner jacket 20, armor layer 22, and outer jacket 24 have been removed. The furcation body 44 is also formed over a portion of the optical fiber ribbons 12 exposed from the core tube 14 and over a portion of fan-out tubes 46 into which the optical fiber ribbons 12 have been inserted, as will be described in greater detail below. The fan-out tubes 46 effectively "upjacket" the bare optical fiber ribbons 12 to facilitate installing the connectors 42 on ends of the optical fiber ribbons 12.

Figure 4:
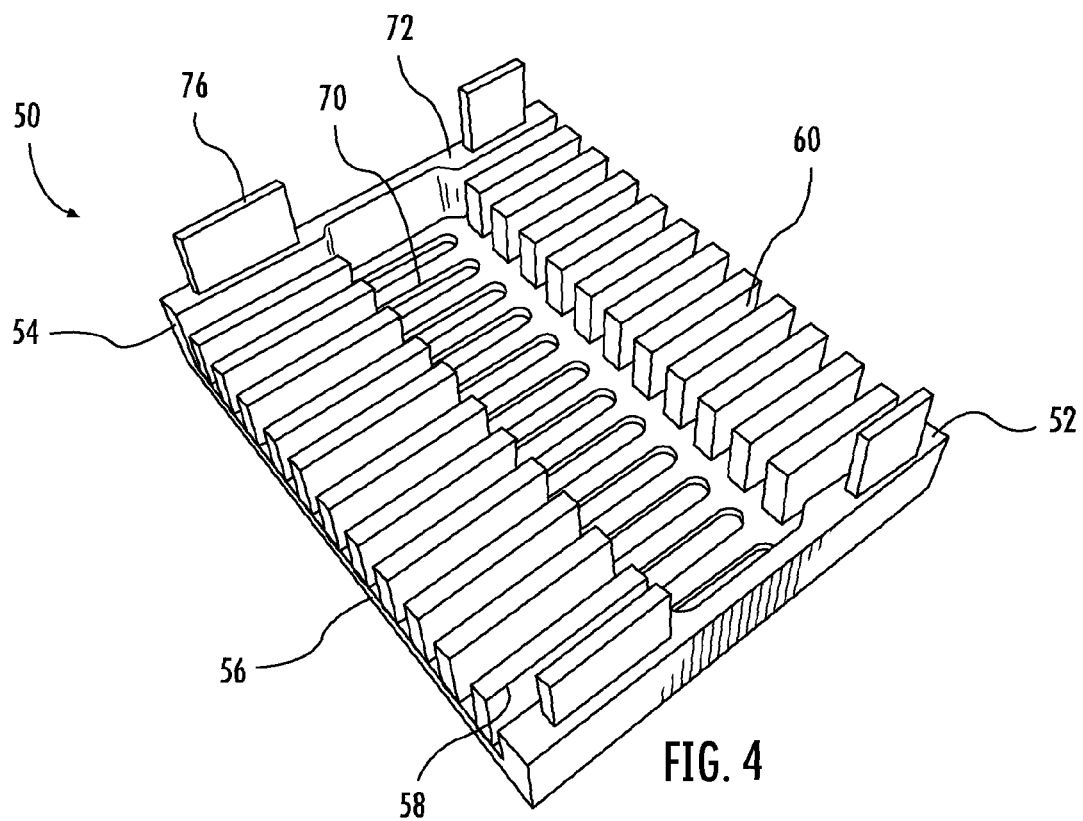
FIG. 4 is a perspective view of a fiber management structure used in the fiber optic cable assembly of FIG. 3.
Figure 5:
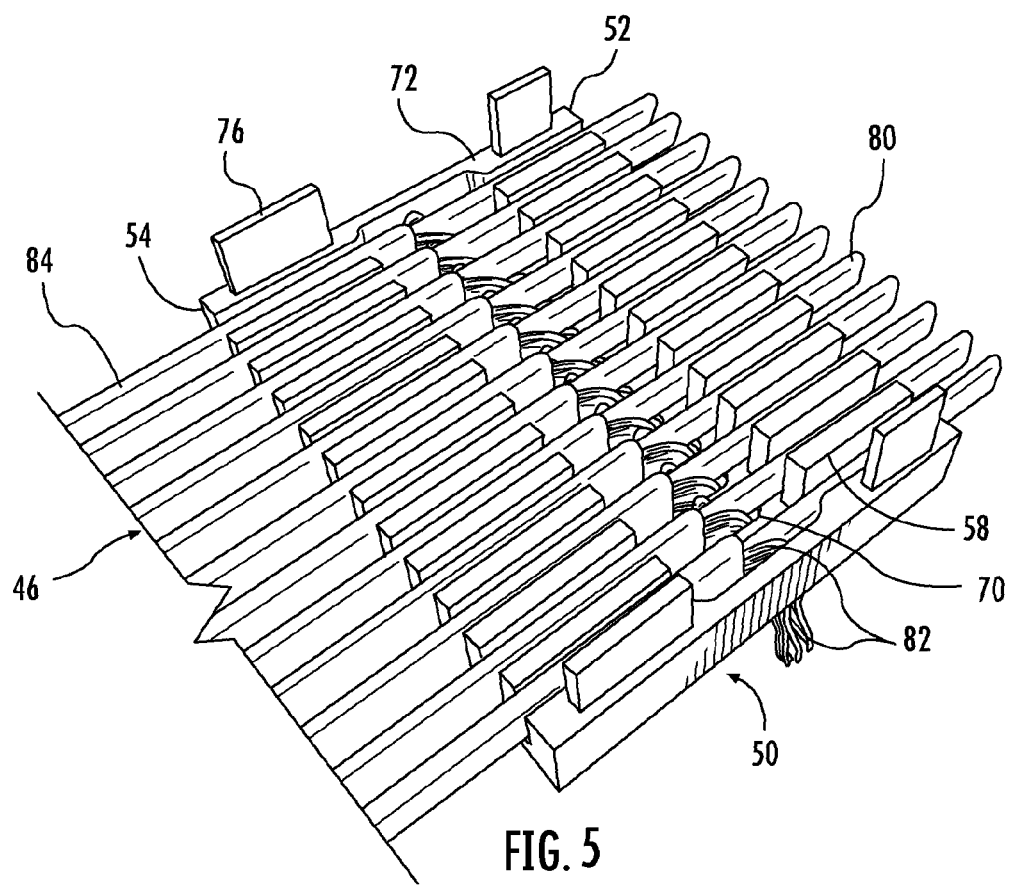
FIG. 5 is a perspective view of fan-out tubes being positioned in the fiber management structure of FIG. 4.

As can be seen, the high fiber count of the fiber optic cable results 10 in many fan-out tubes 46 (and, therefore, optical fiber ribbons 12) extending from the furcation body 44. Despite the large number, the fan-out tubes 46 and optical fiber ribbons 12 are neatly organized as they extend from the furcation body 44. The organized and compact arrangement is facilitated by one or more fiber management structures within the furcation body 44. FIG. 4 illustrates one embodiment of such a fiber management structure, which is designated with reference number 50.

In general, the fiber management structure 50 includes opposed first and second ends 52, 54 and a base wall 56 extending between the first and second ends 52, 54. Inner walls 58 extend upwardly from the base wall 56 and are arranged at spaced apart locations across a width of the fiber management structure 50 to define a plurality of channels 60 extending between the first and second ends 52, 54. The channels 60 are uniform in shape and have a U-shaped or otherwise open cross-section. To this end, the fiber management structure 50 is in the form of a tray having a plurality of slots that define the plurality of channels 60. The base wall 56 and inner walls 58 have flat (i.e., planar) surfaces. Other arrangements are possible, however, including fiber management structures with closed channels (e.g., conduits or enclosed passages), non-uniform channels, and/or channels with one or more non-planar surfaces.

Still referring to FIG. 4, the fiber management structure 50 further includes a plurality of holes 70 extending through the base wall 56 and communicating with the plurality of channels 60. The purpose of the holes 70 will be described in further detail below. Although the outermost inner walls 58 extend along the entire length of the base wall 56 to define continuous side walls, the other inner walls 58 are discontinuous in a region of the base wall 56 containing the plurality of holes 70. The discontinuity provides additional space in the region to facilitate access to the holes 70, which may correspond in number to the number of channels 60, as shown.

Another feature of the fiber management structure 50 that will be described in further detail below is the ability to be stacked on top of another fiber management structure. To this end, the fiber management structure 50 includes top and bottom surfaces 72, 74 having complementary locking features 76, 78. The top surface 72 is defined by the side walls in the embodiment shown, and the locking features 76 on the top surface are in the form of tabs/projections extending further upwardly. The bottom surface 74 (FIG. 6) is defined by the base wall 56, and the locking features 78 thereon are in the form of recesses shaped to receive the projections on the top surface 72. The recesses are aligned with the projections in a vertical direction, allowing the fiber management structure 50 to be stacked on top of another fiber management structure that has the same configuration. The complementary locking features 74, 76 cooperate with each other to help securely the position fiber management structures when stacked in such a manner.

The fiber management structure 50 and fan-out tubes 46 may be provided as part of a fan-out assembly that is, in fact, a sub-assembly used during the furcation of the fiber optic cable 10. FIGS. 5-8 illustrate how such a fan-out assembly may be formed. First referring to FIGS. 5 and 6, the plurality of fan-out tubes 46 are positioned in the plurality of channels 60. Each fan-out tube 46 includes an inner tube 80, a layer of strength members 82 (e.g., aramid yarn) surrounding the inner tube 80, and an outer protective tube 84. The outer protective tube 84 does not extend over the entire length of the fan-out tube 46 such that a portion of the inner tube 80 and a portion of the strength members 82 are exposed. Positioning the fan-out tubes 46 in the channels 60 of the fiber management structure 50 involves arranging the fan-out tubes 46 so that the exposed portions of the inner tubes 80 extend from the first end 52 of the fiber management structure 50 and portions of the fan-out tubes 46 with the outer protective tubes 84 extend from the second end 54. In other words, the transition area or interface between the outer protective tube 84 and the exposed portion of the inner tube 80 in each fan-out tube 46 is arranged between the first and second ends 52, 54 of the fiber management structure 50. The fan-out tubes 46 are rectangular in cross-section in the embodiment shown and positioned in the channels 60 with the longer sides of the rectangle confronting the inner walls 58.

Figure 6:
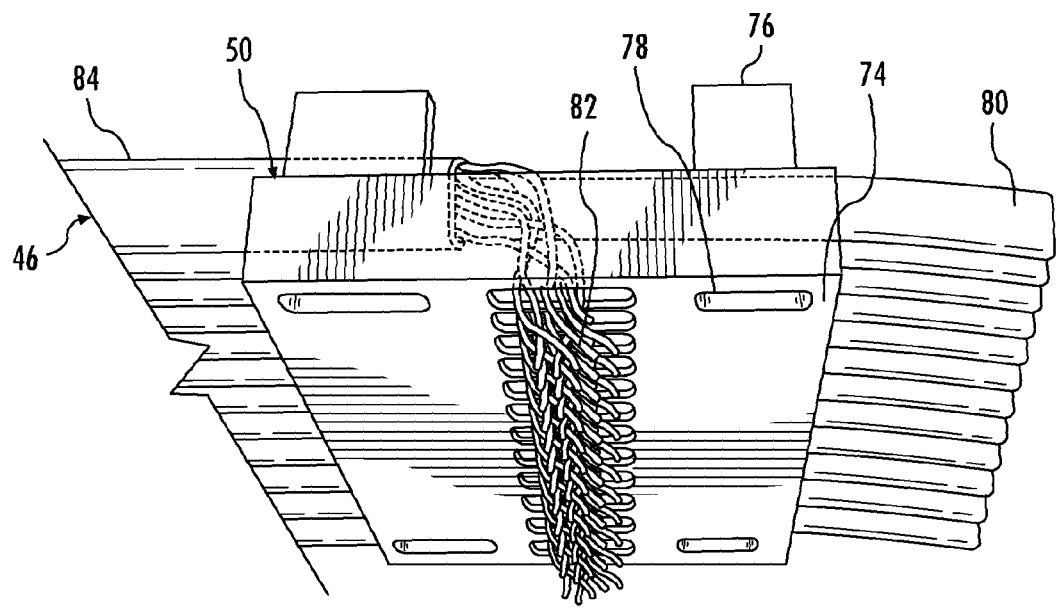
FIG. 6 is a perspective view of fan-out tubes being positioned in the fiber management structure of FIG. 4, but from a different angle than FIG. 5 to show strength members of the fan-out tubes extending through holes in the fiber management structure.

FIG. 6 also illustrates how the strength members 82 of the fan-out tubes 46 are extended through the holes 70 in the base wall 56 of the fiber management structure 50. Tweezers, pliers, or other tools (not shown) may be used to help pull the strength members 82 through the holes 70. Doing so helps prevent the strength members 82 from occupying portions of the channels 60 in which the exposed inner tubes 80 are received. The inner tubes 80 may then be more effectively secured to the fiber management structure 50 by applying an adhesive, such as epoxy, over the inner tubes and channels 60. Each outer protective tube 84 terminates proximate the hole 70 through which the strength members 82 of associated fan-out tube 46 extend.

Figure 7:
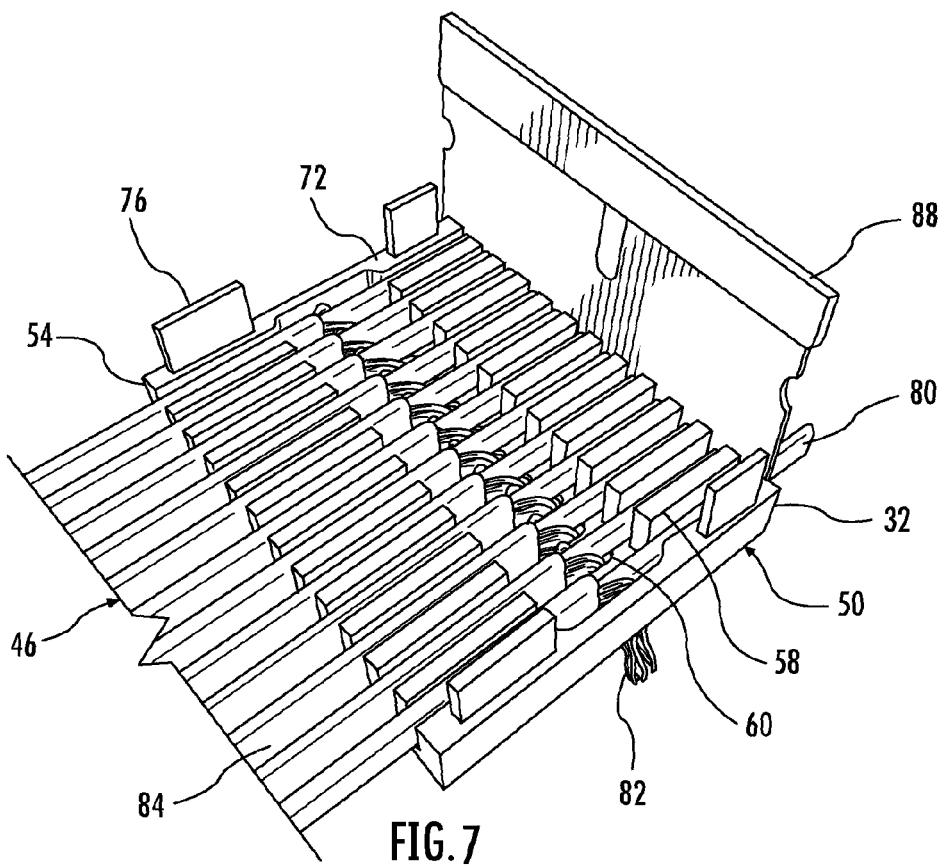
FIG. 7 is a perspective view of the fan-out tubes of FIG. 5 being trimmed proximate a first end of the fiber management structure.
Figure 8:
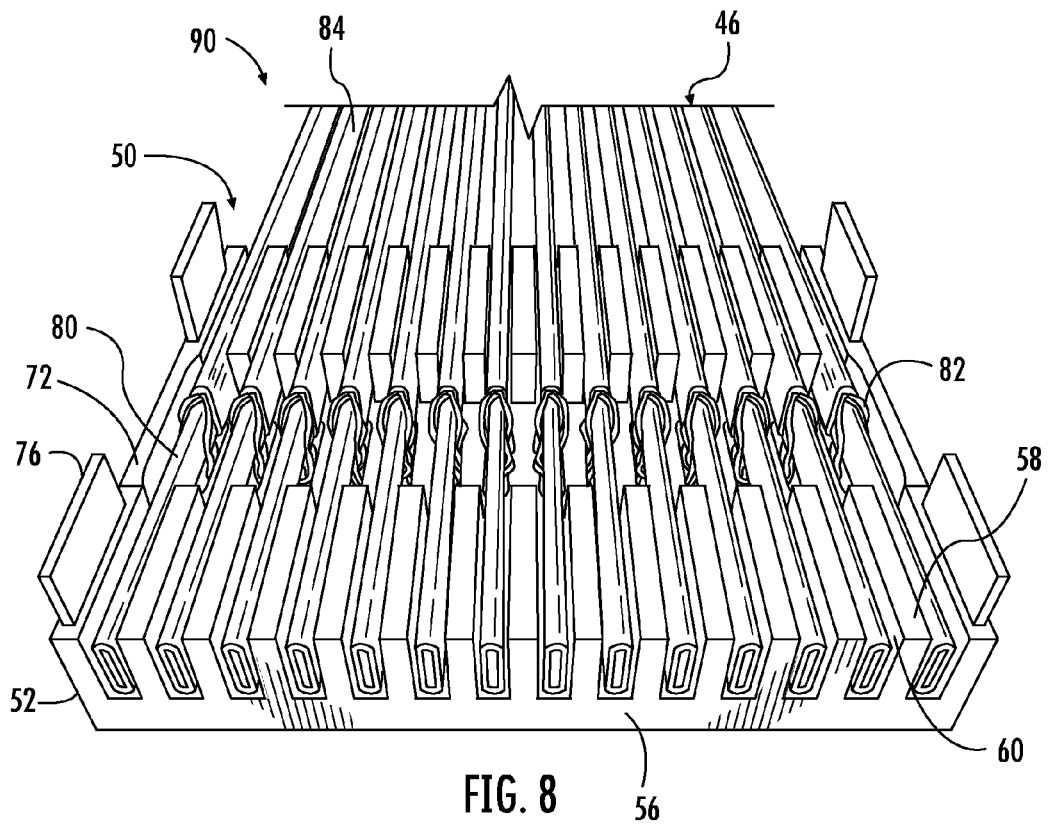
FIG. 8 is a perspective of a completed fan-out assembly including the fiber management structure of FIG. 4 and fan-out tubes of FIG. 5.

As shown in FIG. 7, the inner tubes 80 are eventually trimmed proximate the first end 52 of the fiber management structure 50. A razor blade 88, for example, may be used to cut the inner tubes 80 so that they terminate at the first end 52 of the fiber management structure 50 and are effectively flush with the first end 52, as shown in FIG. 8. The result is then a fan-out assembly 90 ready for use in a furcation. Multiple fan-out assemblies 90 can be produced separate from the furcation process and kept on hand for use as needed. Thus, when a manufacturer receives an order for a cable assembly like the fiber optic assembly 40, the manufacturer does not need to spend time preparing the fan-out assemblies 90 as part of the furcation process for the fiber optic cable 10.

Figure 9:
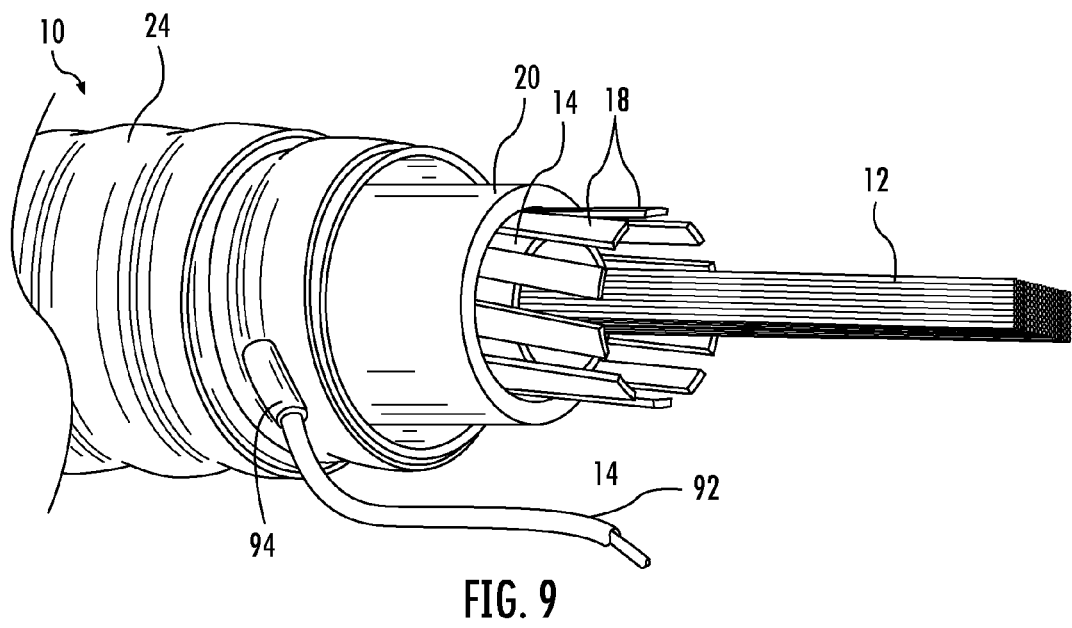
FIG. 9 is a side elevation view of a fiber optic cable that has been prepared for furcation.

Now referring to FIG. 9, the furcation process involves preparing the fiber optic cable 10 for the furcation. The outer jacket 24 is removed from an end portion of the fiber optic cable 10, as is the armor layer 22, inner jacket 20, and core tube 14. The strength members 18 and optical fiber ribbons 12 are exposed as a result of removing these layers. The strength members 18 are trimmed a short distance from the end of the inner jacket 20. The optical fiber ribbons 12 are cleaned by wiping off or otherwise removing the water blocking gel 28. Other steps may be performed depending on the particular design of the fiber optic cable 10. For example, FIG. 9 illustrates a grounding wire 92 coupled to the armor layer 22. Tape 94 is wrapped around the armor layer 22 and over the end of the grounding wire 92 such that neither is exposed.

Figure 10:
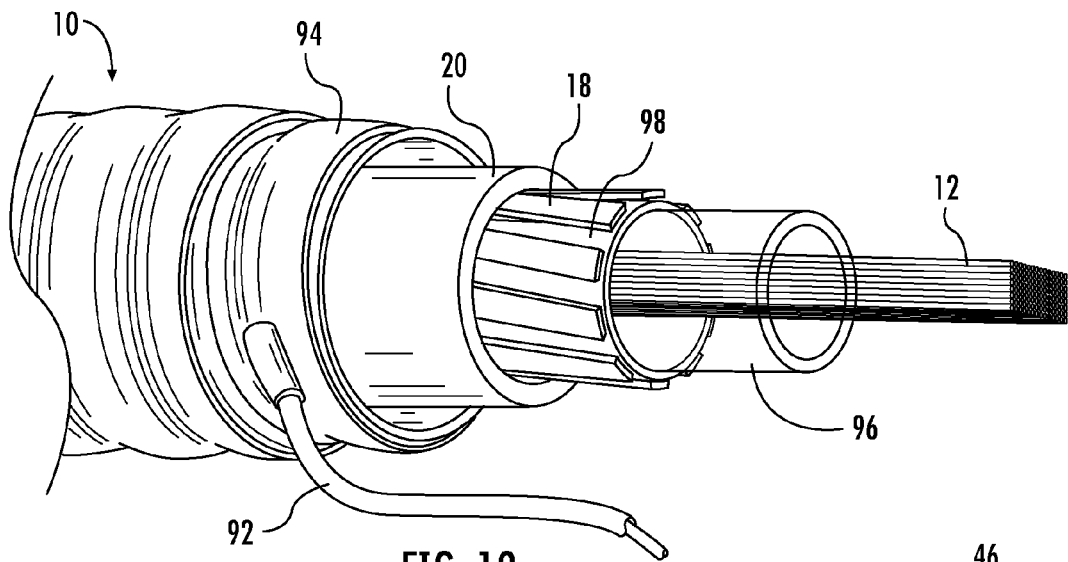
FIG. 10 is a side elevation view of the fiber optic cable of FIG. 9 after installing a transition tube onto the fiber optic cable.

After removing the water-blocking gel 28, the optical fiber ribbons 12 are separated from the matrix (FIGS. 2A and 2B) into individual sub-units. There are 12 optical fibers 26 per sub-unit (i.e., per optical fiber ribbon 12) in the embodiment shown. If necessary, the optical fiber ribbons 12 are cleaned again to complete the cable preparation process. Additionally, prior to installing the fan-out assembly 90 and forming the furcation body 44, a transition tube 96 (FIG. 10) may be inserted over the optical fiber ribbons 12 and moved along the fiber optic cable 10 until the transition tube 96 is received over an end portion of the core tube 14. A heat shrink 98 may be applied over the interface between the transition tube 96 and core tube 14, thereby covering portions of both. The transition tube 96 is ultimately filled with an adhesive, such as epoxy, to secure the optical fiber ribbons 12 relative to the core tube 14 (and, therefore, relative to the fiber optic cable 10). With such an arrangement/step, the exposed portions of the optical fiber ribbons 12 are isolated from stresses and bending imparted by the fiber optic cable 10.

Figure 11:
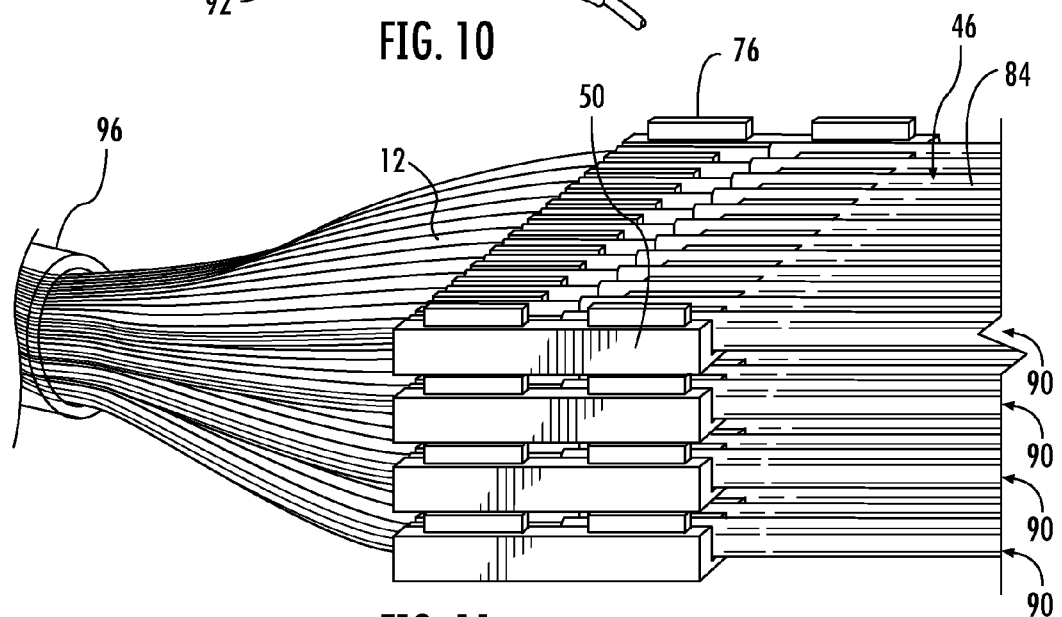
FIG. 11 is a perspective view of optical fiber ribbons from the fiber optic cable of FIG. 9 extending into fan-out tubes of fan-out assemblies.
Figure 12:
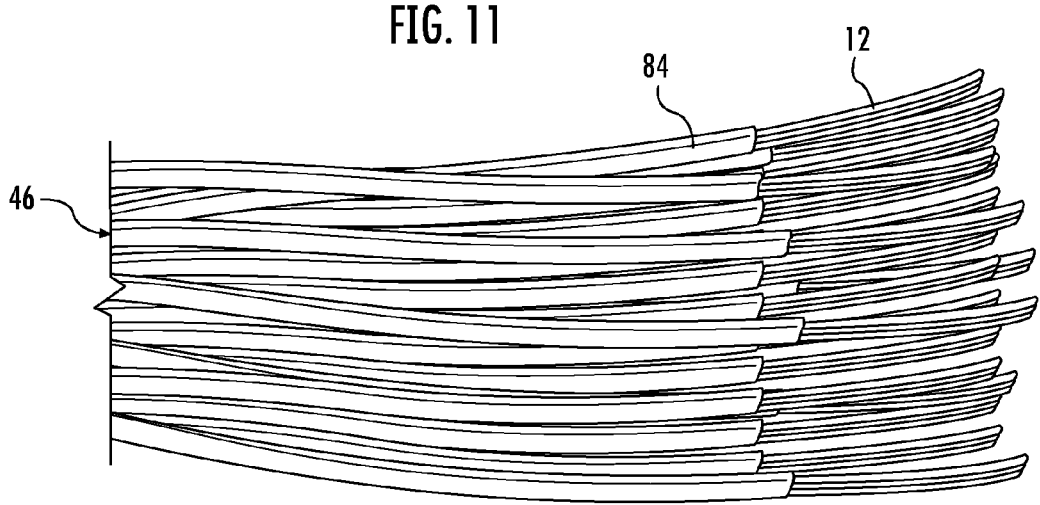
FIG. 12 is a perspective view an end portion of the fan-out assemblies of FIG. 11.

As shown in FIGS. 11 and 12, the fiber optic cable 10 is furcated by inserting the optical fiber ribbons 12 through the fan-out tubes 46 of a plurality of the fan-out assemblies 90. In particular, the optical fiber ribbons 12 are inserted one-at-a-time into respective fan-out tubes 40 in a first one of the fan-out assemblies 90. The optical fiber ribbons 12 may be numbered so that certain optical fiber ribbons 12 are inserted into certain fan-out tubes 46. For example, optical fiber ribbons numbered 1-12 may be inserted sequentially into the fan-out tubes 46 of the first fan-out assembly 90, beginning at one side of the associated fiber management structure 50. At some point the optical fiber ribbons 12 are extended through the fan-out tubes 46 so as to extend beyond the outer protective tubes 84, as shown in FIG. 11. This may be done by inserting optical fiber ribbons 12 a short distance into each fan-out tube 46 of the fan-out assembly 90 and then moving the fan-out assembly 90 along the group of optical fiber ribbons 12. Alternatively, the optical fiber ribbons 12 may be extended through the fan-out tubes 46 as they are inserted, one-at-a-time.

The process described above is repeated for the remainder of the optical fiber ribbons 12 with different fan-out assemblies 90. For example, optical fiber ribbons numbered 13-24 are inserted sequentially into the fan-out tubes 46 of a second one of the fan-out assemblies 90, optical fiber ribbons numbered 25-36 are inserted sequentially into the fan-out tubes 46 of a third one of the fan-out assemblies 90, and optical fiber ribbons numbered 37-48 are inserted sequentially into the fan-out tubes 46 of a fourth one of the fan-out assemblies 90. The number of fan-out assemblies used depends on the number of optical fiber ribbons in the fiber optic cable 10 and the number of fan-out tubes in each fan-out assembly. When multiple fan-out assemblies are used, as is the case in the illustrated example, the fiber management structures 50 may be stacked on top of each other before or after inserting the optical fiber ribbons 12. As mentioned above, the complementary locking features 76, 78 cooperate to secure and position the fiber management structures 50 relative to each other when stacked in such a manner. The result is a compact, neatly organized, easy-to-manage stack.

Figure 13:
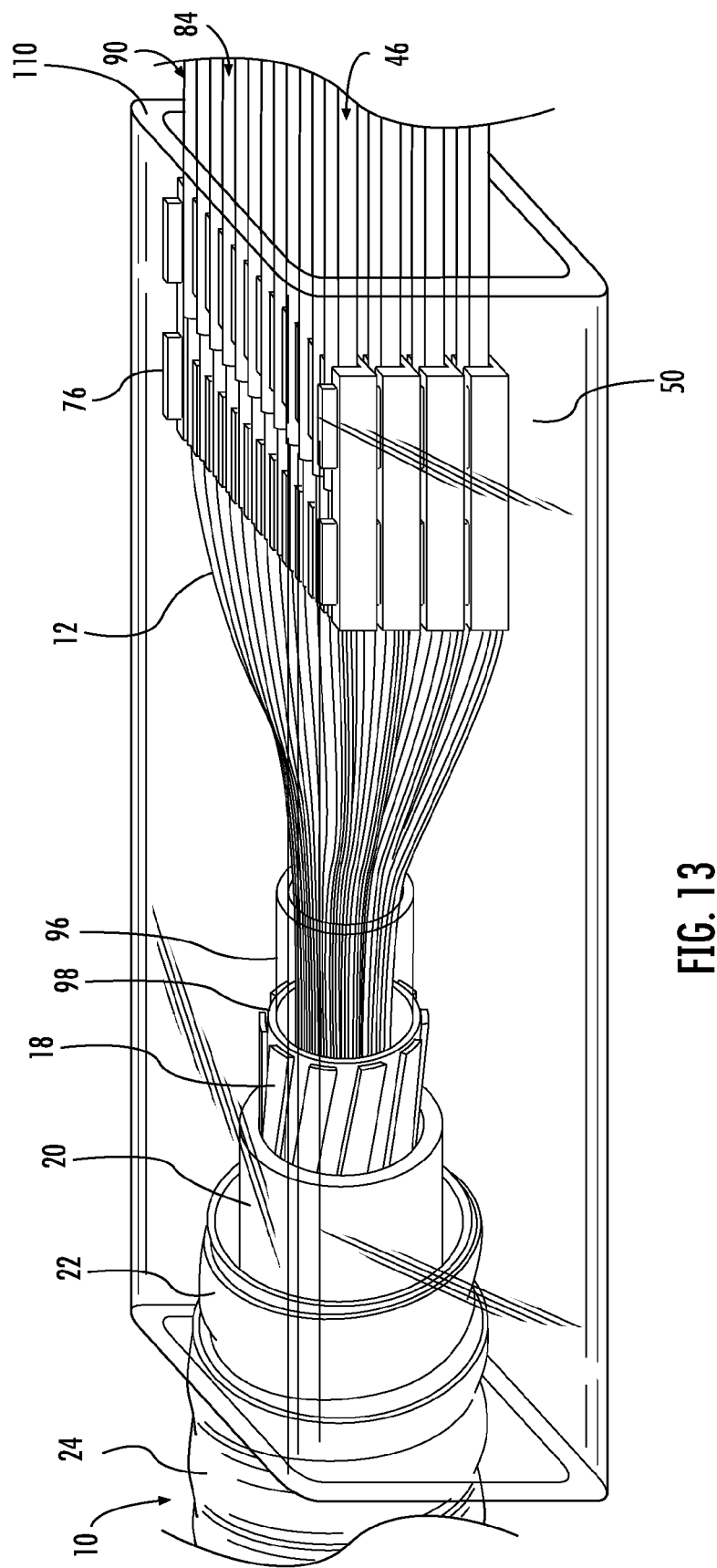
FIG. 13 is a perspective view of a shell positioned over a portion of the fiber optic cable of FIG. 9 and the fan-out assemblies of FIG. 11.
Figure 14:
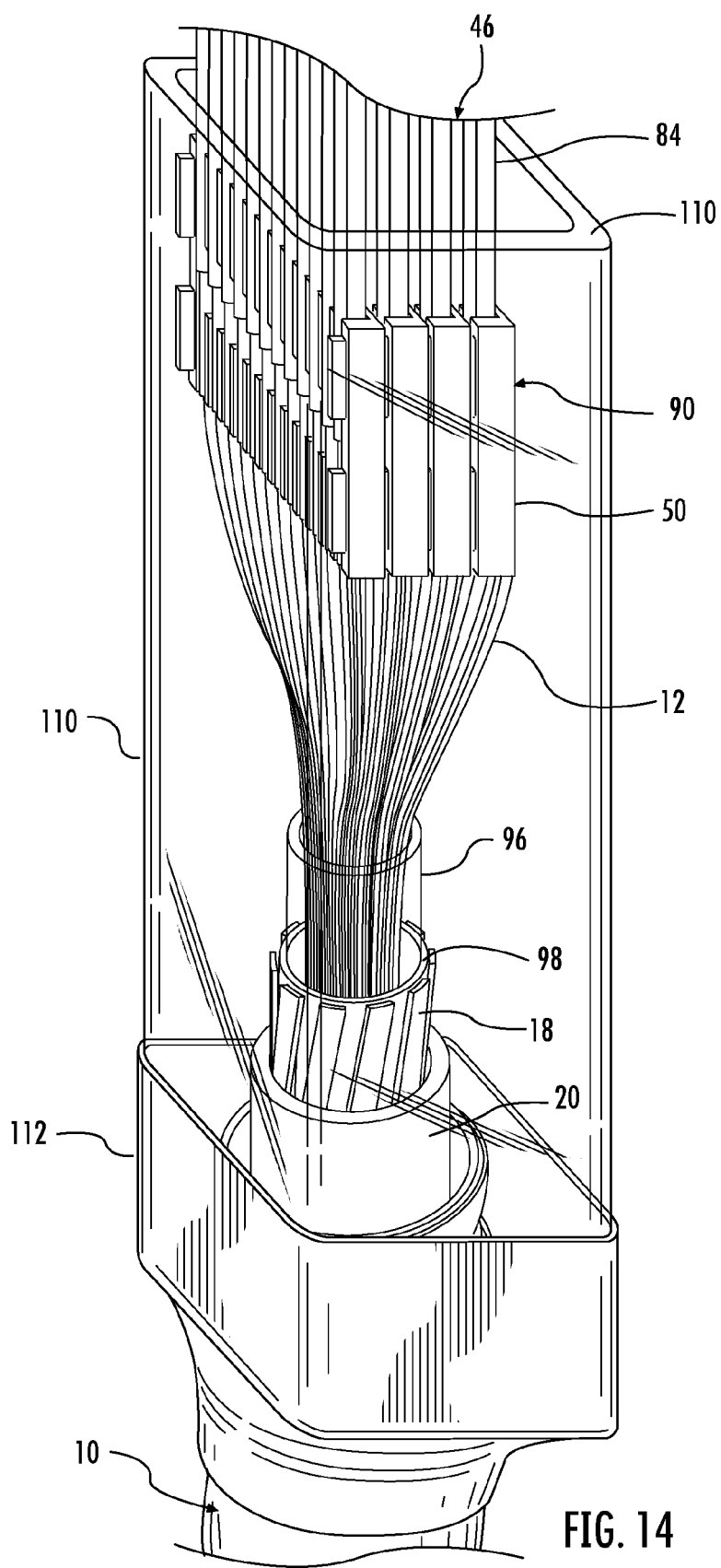
FIG. 14 is a perspective view of the shell after apply a heat shrink and moving the assembly to a vertical orientation.
Figure 15:
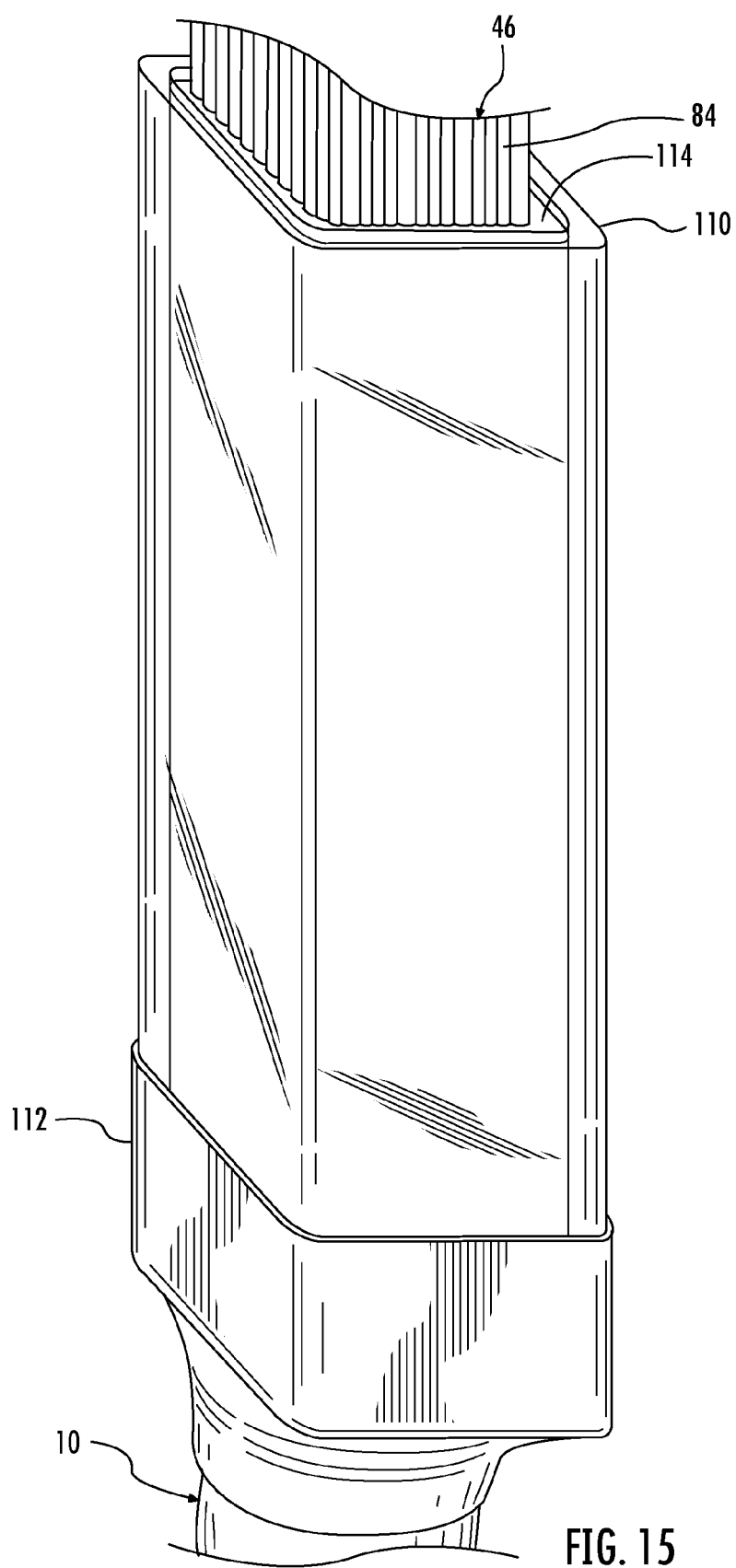
FIG. 15 is a perspective view of the shell of FIG. 13 filled with a thermosetting resin as part of forming a furcation body.

To form the furcation body 44, a shell 110 is moved over the fan-out assemblies 90 until the shell 110 is positioned over the fiber management structures 50 and a portion of the fiber optic cable 10 still including the core tube 14, strength members 18, inner jacket 20, armor layer 22, and outer jacket 24, as shown in FIG. 13. Such positioning also results in the shell 110 extending over the transition tube 96. The shell 110 is rectangular in the embodiment shown, but in alternative embodiments may have a different shape. A heat shrink 112 (FIG. 14) is applied over the interface of the shell 110 and the fiber optic cable 10 so as to cover portions of both and effectively close one end of the shell 110. The shell 110 may be moved to a vertical orientation before or after this step, as shown in FIG. 14. Eventually the shell 110 is filled with a thermosetting resin 114, such as curable adhesive and/or potting compound like epoxy, as shown in FIG. 15. The thermosetting resin 114 is placed into the shell 110 as a liquid so as to surround the fiber management structures 50 and then allowed to cure. The heat shrink 112 is then removed, after which a longer heat shrink is inserted over the fan-out tubes 46, positioned over the shell 110, and applied to complete the formation of the furcation body 44 (FIG. 3). Note that the variations of these steps and different ways of forming the furcation body 44 will be appreciated by persons skilled in the design and manufacture of fiber optic cable assemblies.

After furcating the fiber optic cable 10 in the manner described above, the resulting fiber optic assembly 40 may be made into a cable assembly by installing the connectors 42 (FIG. 3) onto the ends of the optical fiber ribbons 12 that extend through the fan-out tubes 46 (see FIG. 12). One advantage of the fiber optic cable 10 being furcated/terminated in the manner described above is that a preterminated solution is offered by the cable assembly manufacturer that does not involve a large furcation body despite the high fiber count. The cross-sectional area of the furcation body 44 is kept to a minimum because of the organized manner in which the fiber management structures 50 position and maintain the fan-out tubes 46. This helps meet requirements customers may impose for the cable assembly fitting within ducts or conduits. Additionally, the length of the furcation body 44 is minimized to help meet bend radius requirements.

Figure 16:
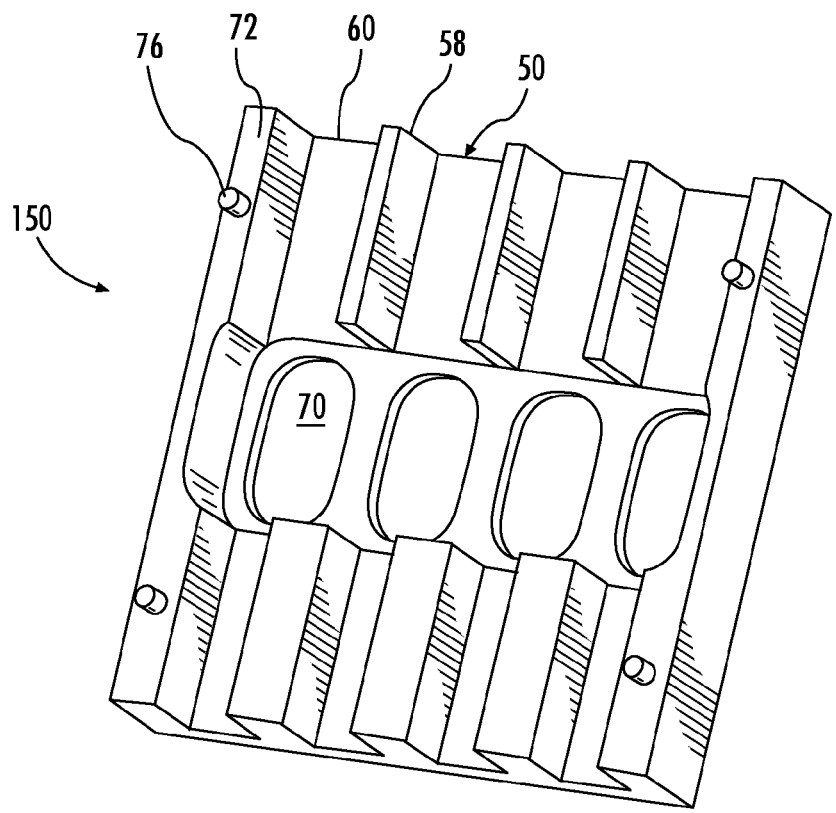
FIG. 16 is a perspective view of a fiber management structure according to an alternative embodiment.
Figure 17:
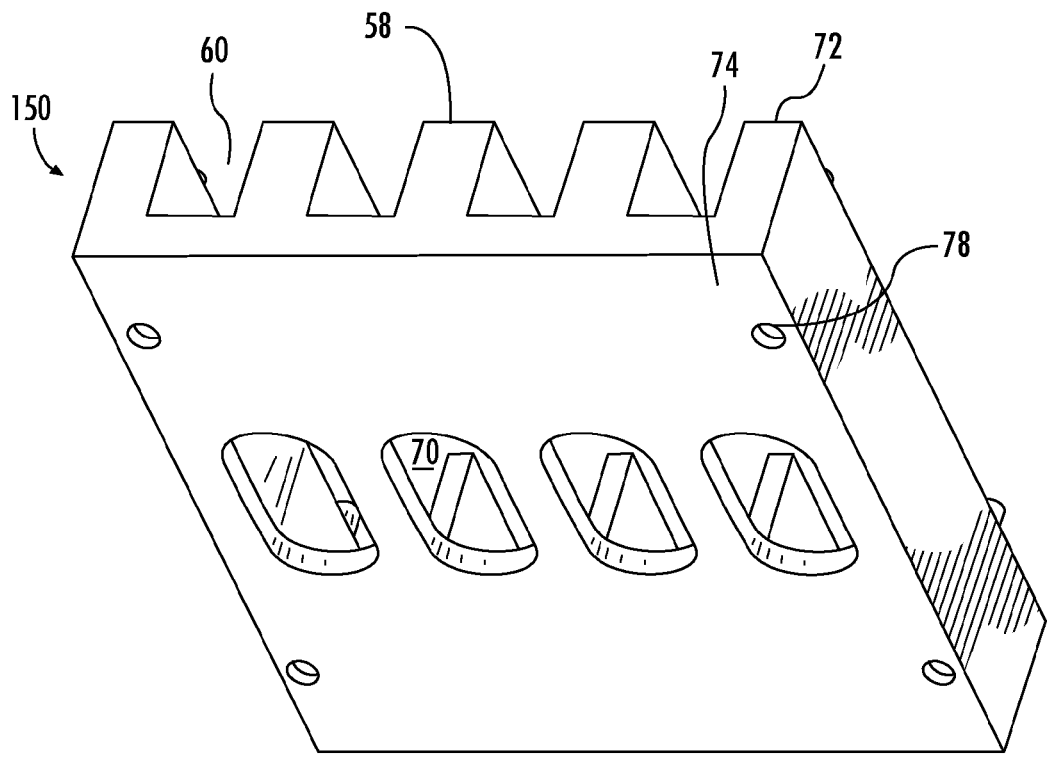
FIG. 17 is a perspective view of the fiber management structure of FIG. 16 from a different angle.
Figure 18:
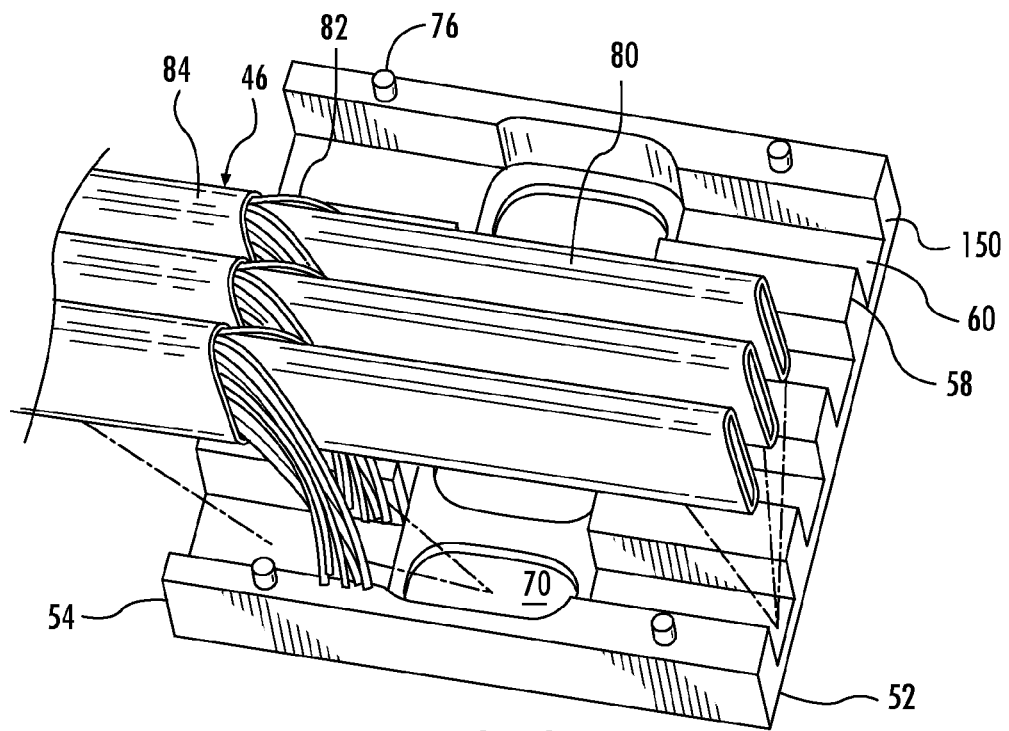
FIG. 18 is a perspective view of multiple fan-out tubes being positioned in a channel of the fiber management structure of FIG. 16.
Figure 19:
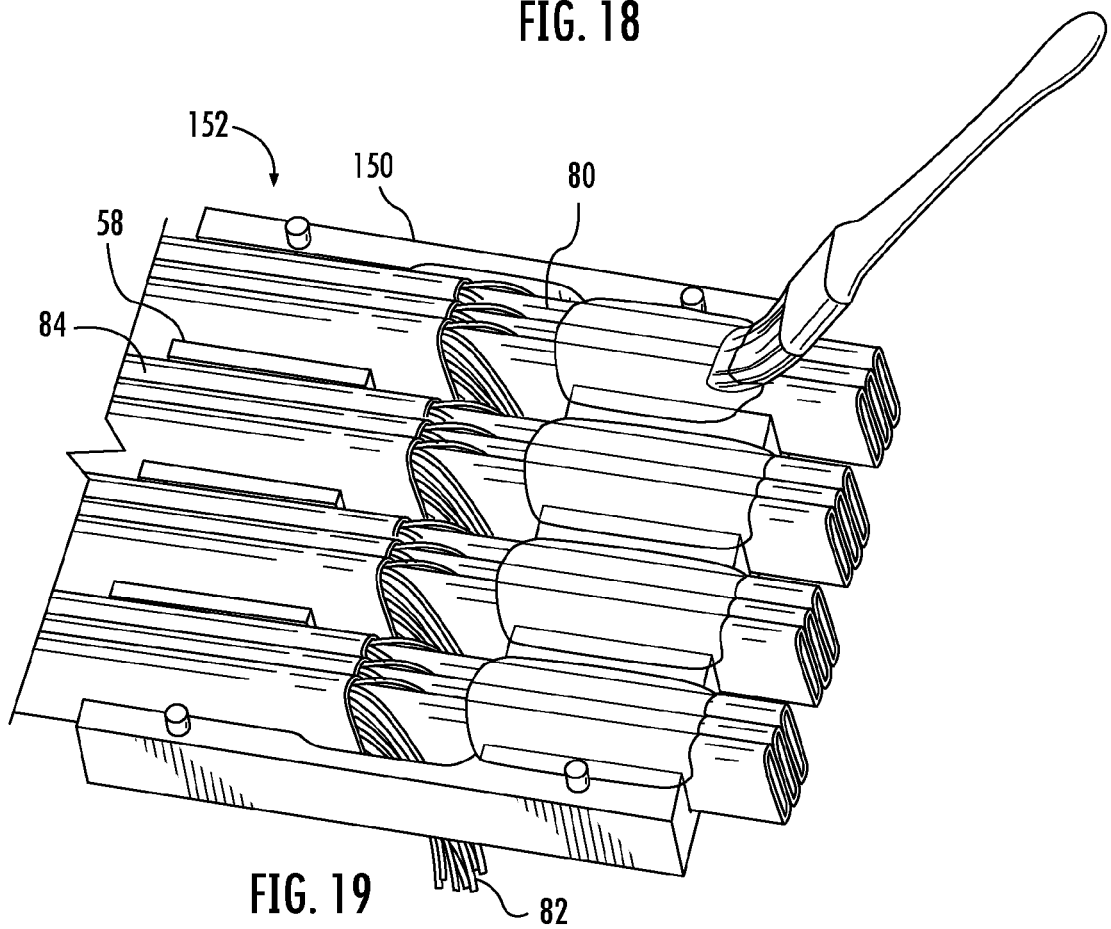
FIG. 19 is a perspective view of fan-out tubes being secured to the fiber management structure of FIG. 16 as part of forming a fan-out assembly.

FIGS. 16 and 17 illustrate a fiber management structure 150 according to an alternative embodiment. In this embodiment, the locking features 76 on the top surface 72 of the fiber management structure 50 are cylindrical pins/projections. The locking features 78 on the bottom surface 74 are recesses shaped to receive the cylindrical pins. Additionally, rather than including channels 60 for individual fan-out tubes and optical fiber ribbons, the fiber management structure 50 includes channels 60 each configured to receive multiple fan-out tubes and optical fiber ribbons. FIG. 18 illustrates three fan-out tubes 46 being positioned in one of the channels 60. The fan-out tubes 46 are arranged side-by-side, sandwiched between the corresponding inner walls 58. Strength members 82 of the fan-out tubes 46 are still extended through the hole 70 in the base wall 56 that opens into the channel 60, similar to the embodiment discussed above. FIG. 19 illustrates the fiber management structure 150 after all fan-out tubes 46 have been positioned in the channels 60, with an adhesive being applied over the inner tubes 80 to secure the fan-out tubes 46 to the fiber management structure 150 as part of forming a fan-out assembly 152, similar to the first embodiment discussed above. Other aspects pertaining to the formation of the fan-out assembly 152 and its use as part of a fiber optic assembly may be similar to those discussed above with respect to the fan-out assembly 90.

It will be apparent to those skilled in the art that various additional modifications and variations can be made without departing from the scope of the claims below. For example, the fiber management structures may include channels for receiving round fan-out tubes rather than rectangular fan-out tubes, and thereby form fan-out assemblies for fiber optic cables having individually-stranded optical fibers (i.e., not contained in ribbons). Additionally, the fiber management structures and fan-out tubes may be provided individually rather than as part of a fan-out assembly for use during a furcation process. In other words, the fiber management structures and fan-out tubes need not always be pre-assembled prior to furcating a fiber optic cable.

Since modifications combinations, sub-combinations, and variations of the disclosed embodiments may occur to persons skilled in the art, the claims below should be construed to include everything within their literal scope and their equivalents.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

What is claimed is:

1. A fan-out assembly, comprising:
   a plurality of fan-out tubes each comprising an inner tube, a layer of strength members surrounding the inner tube, and an outer protective tube; and
   a fiber management structure having opposed first and second ends, a base wall and plurality of channels extending between the first and second ends, and a plurality of holes extending through the base wall, the plurality of holes communicating with the plurality of channels;
   wherein the plurality of fan-out tubes are secured in and extend from the plurality of channels, and further wherein the strength members of the plurality of fan-out tubes extend through the plurality of holes.

2. The fan-out assembly of claim 1, wherein the inner tube of each fan-out tube terminates proximate the first end of the fiber management structure.

3. The fan-out assembly of claim 1, wherein the channels are defined between inner walls of the fiber management structure that are positioned on the base wall, the inner walls being discontinuous in a region of the base wall containing the plurality of holes.

4. The fan-out assembly of claim 1, wherein the outer protective tube of each fan-out tube terminates proximate the hole through which the strength members of the fan-out tube extend.

5. The fan-out assembly of claim 1, wherein each fan-out tube is shaped to receive an optical fiber ribbon.

6. The fan-out assembly of claim 5, wherein multiple fan-out tubes are secured in each channel.

7. The fan-out assembly of claim 1, wherein the fiber management structure comprises a tray having a plurality of slots defining the plurality of channels.

8. The fan-out assembly of claim 1, wherein the fiber management structure includes top and bottom surfaces having complementary locking features such that the locking features on the top surface of the fiber management structure are configured to engage the locking features on the bottom surface of another fiber management structure having the same configuration.

9. The fan-out assembly of claim 1, wherein the plurality of channels are uniform in shape.

10. A fiber optic assembly, comprising: a fiber optic cable including a plurality of optical fibers, a buffer tube surrounding the plurality of optical fibers, one or more layers of strength members surrounding the buffer tube, and one or more jackets surrounding the one or more layers of strength members, wherein the buffer tube and the one or more jackets are removed from an end portion of the fiber optical cable to expose the plurality of optical fibers and strength members; a plurality of fan-out tubes received over the plurality of optical fibers that are expose at the end portion of the fiber optic cable; a fiber management received structure including a plurality of channels extending between opposed first and second ends of the fiber management structure, the plurality of fan-out tubes being received in and extending from the plurality of channels; and a furcation body formed over the fiber management structure and a portion of the one or more layers of strength members; wherein the fiber management structure further includes a base wall extending between the first and second ends and a plurality of holes extending through the base wall, the plurality holes communicating with the plurality of channels, the plurality of fan-out tubes being secure in the plurality of channels, and the strength members of the plurality of fan-out tubes extending through the plurality of holes.

11. The fiber optic assembly of claim 10, wherein the plurality of fan-out tubes each comprise an inner tube, a layer of strength members, and an outer protective tube, the inner tube extending from the outer protective tube so as to define an interface therewith, the interface being positioned in the channel of the fiber management structure in which the fan-out tube is received.

12. The fiber optic assembly of claim 10, wherein the inner tube of each fan-out tube terminates proximate the first end of the fiber management structure.

13. The fiber optic assembly of claim 10, wherein the plurality of optical fibers comprises a plurality of optical fiber ribbons that each include multiple rows of optical fibers, and further wherein each of the fan-out tubes is received over a respective one of the optical fiber ribbons.

14. The fiber optic assembly of claim 10, further comprising a plurality of the fiber management structures stacked on top of each other within the furcation body, wherein each fiber management structure includes top and bottom surfaces having complementary locking features such that the locking features on the top surface of one of the fiber management structures are configured to engage the locking features on the bottom surface of another of the fiber management structures.

15. The fiber optic assembly of claim 10, wherein the furcation body comprises a shell positioned over the fiber management structure and a thermosetting resin that has been placed into the shell as liquid to surround fiber management structure and that has been allowed to cure, thereby forming a plug.

16. The fiber optic assembly of claim 10, further comprising a plurality of connectors installed on ends of the plurality of optical fibers that extend from the plurality of fan-out tubes.

* * * * *